Patented June 23, 1942

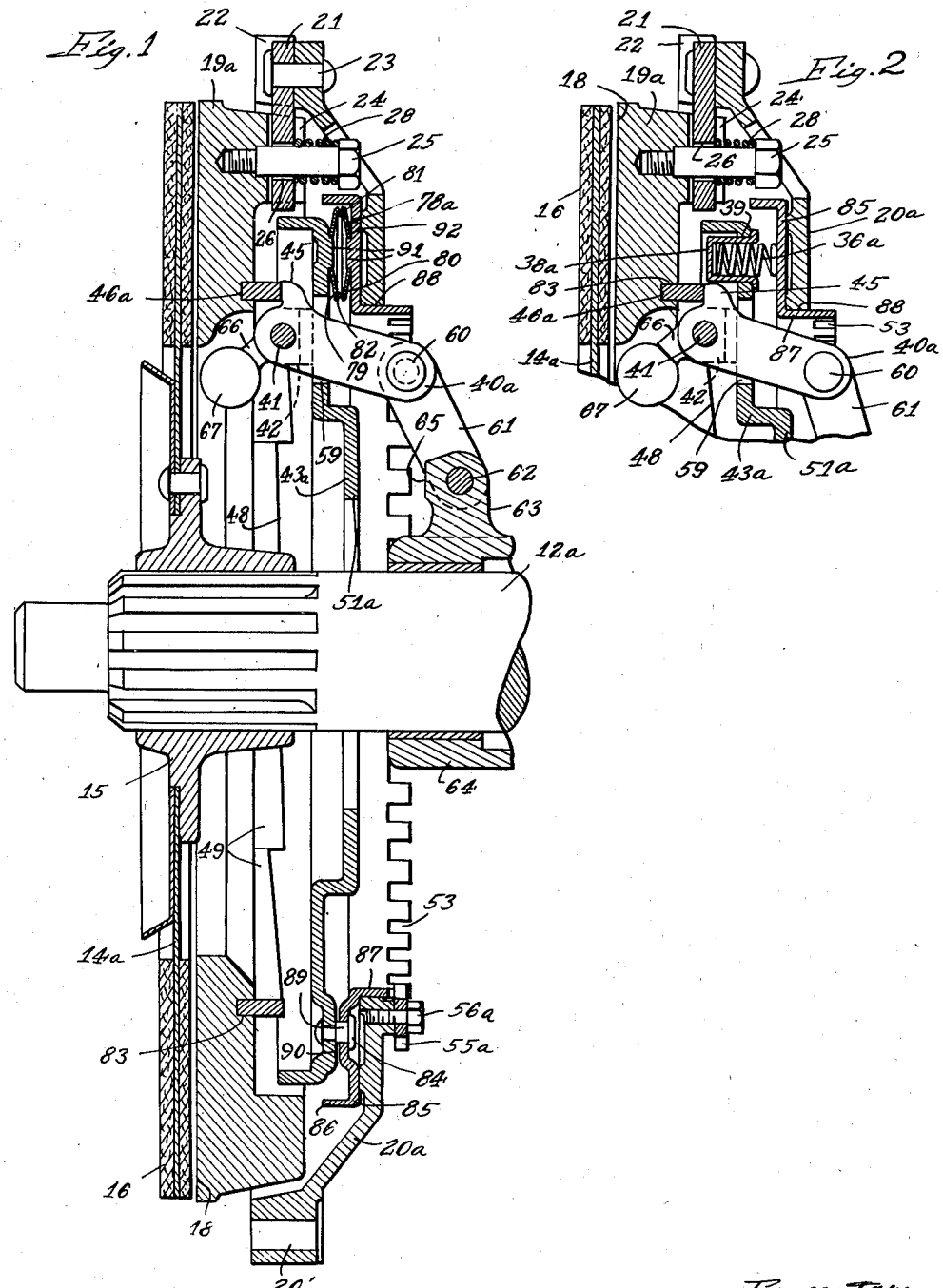

2,287,630

UNITED STATES PATENT OFFICE 2,287,630

CLUTCH

Kay Miller, Rockford, Ill., assignor to The Atwood Vacuum Machine Company, Rockford, Ill., a copartnership composed of Seth B. Atwood and James T. Atwood Application April 12, 1941, Serial No. 388,283

4 Claims. (Cl. 192—68)

This invention relates to friction clutches and is more particularly concerned with over-center type clutches especially designed for tractors, although suitable, of course, for other heavy duty purposes.

The principal object of my invention is to provide an over-center type clutch of simple, economical, and practical design and construction obtaining substantially constant engaging pressure regardless of wear and operating satisfactorily with fairly coarse and infrequent adjustment.

The invention is illustrated in the accompanying drawing, in which—

Fig. 1 is a longitudinal section through a clutch made in accordance with my invention, the same being shown in disengaged position, and Fig. 2 is a fragmentary sectional detail illustrating a variation in the construction of Fig. 1.

Similar reference numerals are applied to corresponding parts in these two views.

Referring first to Fig. 1, the clutch shown is designed for application to the usual flywheel on the crank-shaft of an engine. 12a is the driven shaft extending rearwardly from the flywheel and clutch into the gear box of the transmission in the usual way and supported at its front end at the center of the flywheel. 14a is the clutch disk, the center hub 15 of which is splined on the front end of the shaft 12a to transmit drive from the flywheel to the shaft when the clutch is engaged. The usual pads or facings 16 on the clutch disk are engageable with the driving face on the flywheel and the companion driving face 18 on the pressure plate 19a. The latter is suitably cast like the flywheel, the face 18 being accurately machined to insure smooth clutch engagement. The back plate 20a is also a casting and is arranged to be bolted at 20' to the rim of the flywheel. Small rectangular plates 21, fitting in radial grooves 22 in the rim of the back plate, are secured in place by rivets 23 and have a working fit in radial grooves 24 in the rim portion of the pressure plate 19a to drive the pressure plate with the flywheel, while allowing axial movement of the pressure plate relative to the flywheel, as required in the engagement and disengagement of the clutch. Bolts 25 are entered freely through holes 26 in the plates 21 and threaded in holes 27 in the pressure plate to provide mountings for coiled compression springs 28 acting between the plates 21 and the heads of the bolts 25, as shown, to urge the pressure plate normally away from the flywheel and clutch disk to retracted disengaged position. The pressure plate 19a carries circumferentially extending cam means 46a for abutment with the finger portions 45 of clutch actuating levers 40a which are pivoted, as at 41, on ears 42 provided on a sheet metal ring 43a rotatably mounted on the back plate 20a in concentric relation with the flywheel and pressure plate. In that way the proper relationship is always assured between the fingers 45 on the intermediate pivot portions of the levers 40a and cam means 46, such relationship being important because the ring 43a, as will presently appear, is arranged to be adjusted rotatively relative to the back plate to adjust the fingers 45 of the levers relative to the inclined helical cam surfaces 48 on the correlated arcuate segments 49 of the circumferentially extending cam means 46 to compensate for wear on the clutch disk facings 16. The segments 49, of which there happen to be six, one for each of six levers 40a, are formed from straight strips of sheet metal bent to the desired arcuate shape and entered with a press fit in the annular groove 83 provided therefor in the pressure plate 19a in concentric relation to the shaft 12a. The ring 43a is connected at a plurality of circumferentially spaced points, as indicated at 84, with another sheet metal ring 85, which has an outer annular flange 86 for reinforcement thereof and a concentric inner annular flange 87, by means of which the ring 85 is supported for rotary adjustment in the circular opening 88 in the back plate 20a in concentric relation to the shaft 12a. The edge of the flange 87 is notched, as indicated at 53, to facilitate rotary adjustment of the rings 43a and 85. The gear 55a which meshes with the notched edge 53 of the flange 87 is freely rotatable on the smooth shank of the screw 56a, which is threaded in a hole in the back plate, and when this screw is tightened the gear is clamped so as to hold the ring 85 in adjusted position, and, of course, when the screw is loosened the gear is free to turn to permit rotary adjustment of the ring 85. In that way the levers 40a are arranged to be adjusted relative to the cam means 46a and held securely in adjusted position. The rivets 84, by means of which the rings 85 and 43a are fastened together, are shouldered, as indicated at 89, to leave a clearance space, as indicated at 90, between the rings, whereby to predetermine the extent to which the preloaded Belleville spring washer assemblies 78a, which are mounted in circumferentially spaced relation between the rings 43a and 85 in a preloaded condition, may be further compressed in the engagement of the clutch. Each of these Belleville spring washer assemblies consists of two spring washers 79 and 80 with a spacer ring 81 therebetween held in centered relationhip with the washers within the curled or flanged peripheries 82 thereof. The rings 43a and 85 have small cylindrical bosses 91 struck therefrom, which fit freely in circular holes 92 in the centers of the washers 79 and 80, so as to hold the washers against lateral or radial displacement with respect to the rings.

The levers 40a project through slots 59 in the ring 43a for pivotal connection, as at 60, with toggle links 61, which, in turn, are pivotally connected at 62 with lugs 63 on a throw-out collar 64. The flat surface 65 on the front of each lug 63 serves by engagement with the edge of the inner flange 51a on the ring 43a to limit the forward movement of the throw-out collar in the engagement of the clutch when the pivots 62 have moved past a plane through the pivots 60 normal to the shaft 12a; in other words, when the toggle links 61 for operating the levers 40 have been moved "over center." Each of the levers 40a has an arm 66 extending forwardly from the pivot portion of the lever and enlarged at the outer end, as indicated at 67, to serve as a counterweight, the centrifugal force on which will balance the centrifugal force on the rear end portion of the lever and thus eliminate that as a factor in the operation of the clutch. The throw-out collar 64 is operable in the usual way by a conventional yoke or other clutch operating means.

In operation, it will be understood that the Belleville spring washer assemblies 78a are preloaded to about 130 lbs. pressure and in the engagement of the clutch are arranged to be compressed further, to about 260 lbs. pressure, so as to exert that pressure on the clutch disk through the pressure plate 19a so long as the clutch is engaged. The clearances at 90 when the clutch is disengaged are approximately .060″ and in the engagement of the clutch only a portion of that clearance is absorbed—about .030″. Due to the inherent low rate characteristic of the Belleville spring washers within the operating range, there is very little decrease in the engaging pressure due to wear of the clutch disk facings 16, and it is also apparent that satisfactory operation is obtainable with fairly coarse and infrequent adjustment. In the engagement of the clutch, the forward movement of the throw-out collar 64 is limited by engagement of the surfaces 65 on the lugs 63 with the flange 51a on the ring 43a when the pivots 62 have moved past a plane through the pivots 60 normal to the shaft 12a, namely, when the toggle links 61 for operating the levers 40a have been moved "over center."

The clutch, a portion of which is illustrated in Fig. 2, is substantially identical with that of Fig. 1 but has coiled compression springs 38a provided between the rings 43a and 85, the ring 43a having cups 38a provided in holes 39 to accommodate the springs. The operation of this clutch is very similar to that just described except for the fact that the coiled compression springs 38a have different characteristics from the Belleville spring washers.

It is believed the foregoing description conveys a good understanding of the objects and advantages of my invention. The appended claims have been drawn to cover all legitimate modifications and adaptations.

I claim:

1. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a ring mounted for rotary adjustment relative to the back plate, circumferentially extending cam means on the pressure plate in concentric relation with said ring, one or more elongated levers extending in the general direction of the axis of rotation of said clutch but radially spaced therefrom, each pivoted intermediate its ends on said ring and having a radially projecting finger on the pivoted portion engaging the circumferentially extending cam means, a counterweight on one end of each of said levers, and means including toggle links pivotally connected with the other end of said levers for oscillating the same to force the pressure plate away from the back plate to engage the clutch, said levers being adjustable with the ring circumferentially with respect to the cam means.

2. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a ring mounted for rotary adjustment relative to the back plate, circumferentially extending cam means on the pressure plate in concentric relation with said ring, one or more elongated levers extending in the general direction of the axis of rotation of said clutch but radially spaced therefrom, each pivoted intermediate its ends on said ring and having a radially projecting finger on the pivoted portion engaging the circumferentially extending cam means, a counterweight on one end of each of said levers, means including toggle links pivotally connected with the other end of said levers for oscillating the same to force the pressure plate away from the back plate to engage the clutch, said levers being adjustable with the ring circumferentially with respect to the cam means, and spring means supported on the back plate in preloaded condition and arranged to be subjected to further compression by said ring in the engagement of the clutch whereby said springs exert increased pressure on the pressure plate while the clutch is engaged.

3. In a friction clutch, the combination with a flywheel constituting the driving element, and a clutch disk constituting the driven element, of a back plate for the flywheel, a pressure plate turning with the back plate and movable toward and away from the same in the disengagement and engagement of the clutch, respectively, a ring mounted for rotary adjustment relative to the back plate, circumferentially extending cam means on the pressure plate in concentric relation with said ring, one or more elongated levers extending in the general direction of the axis of rotation of said clutch but radially spaced therefrom, each pivoted intermediate its ends on said ring and having a radially projecting finger on the pivoted portion engaging the circumferentially extending cam means, a counterweight on one end of each of said levers, and means including toggle links pivotally connected with the other end of said levers for oscillating the same to force the pressure plate away from the back plate to engage the clutch, and a throw-out collar pivotally connected with the ends of said links remote from the levers and movable toward and away from engagement with the ring, said ring limiting movement of the throw-out collar when the toggle links have been moved over center in the engagement of the clutch, said levers being adjustable with the ring circumferentially with respect to the cam means.

4. In a friction clutch, the combination with a flywheel constituting the driving element, and a clutch disk constituting the driven element, of a back plate for the flywheel, a pressure plate turning with the back plate and movable toward and away from the same in the disengagement and engagement of the clutch, respectively, a ring mounted for rotary adjustment relative to the back plate, circumferentially extending cam means on the pressure plate in concentric relation with said ring, one or more elongated levers extending in the general direction of the axis of rotation of said clutch but radially spaced therefrom, each pivoted intermediate its ends on said ring and having a radially projecting finger on the pivoted portion engaging the circumferentially extending cam means, a counterweight on one end of each of said levers, means including toggle links pivotally connected with the other end of said levers for oscillating the same to force the pressure plate away from the back plate to engage the clutch, and a throw-out collar pivotally connected with the ends of said links remote from the levers and movable toward and away from engagement with the ring, said ring limiting movement of the throw-out collar when the toggle links have been moved over center in the engagement of the clutch, said levers being adjustable with the ring circumferentially with respect to the cam means, and spring means supported on the back plate in preloaded condition and arranged to be subjected to further compression by said ring in the engagement of the clutch whereby said springs exert increased pressure on the pressure plate while the clutch is engaged.

KAY MILLER.